United States Patent Office 3,523,092
Patented Aug. 4, 1970

3,523,092
METHOD OF PREPARING SUPPORTED CRYSTALLINE ALUMINO-SILICATE ZEOLITES
Kenneth K. Kearby, Watchung, N.J., assignor to Esso Research and Engineering Company, a corporation of Delaware
No Drawing. Filed Nov. 14, 1967, Ser. No. 682,997
Int. Cl. B01j 11/40
U.S. Cl. 252—455      15 Claims

ABSTRACT OF THE DISCLOSURE

This disclosure relates to a process for preparing supported crystalline alumino-silicate zeolites. The reagents used to prepare the crystalline zeolites are combined in the presence of a suitable support, and the zeolite is crystallized onto the surface of the support. In combining the reagents, the silica source is first dry-mixed with the inert support and the silica-support mixture is then combined with a solution or suspension containing a source of alumina and a source of an alkali metal oxide. High yields of the crystalline alumino-silicate zeolite are obtained.

BACKGROUND

This invention relates to supported crystalline alumino-silicate zeolites and to a method for preparing such materials. More particularly, this invention relates to supported crystalline alumino-silicate zeolites which are prepared by crystallizing the alumino-silicate zeolites on the surface of an inert support material and to a method of preparing said supported zeolites.

The crystalline alumino-silicate zeolites are well known in the art and may be represented, in their hydrated form, by the formula:

$$M_{2/n}O:Al_2O_3:wSiO_2:yH_2O$$

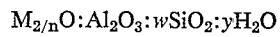

wherein M is a cation, n is the valence of the cation, w is the number of mols of $SiO_2$ per mol of $Al_2O_3$ in the crystalline lattice and y is the number of mols of $H_2O$. In general, M will be one or more metal cations having a valence between 1 and 3; the value of w will range between about 0.7 and 7.5 and y will range up to about 9. These materials may be prepared by heating a suitable mixture of oxides and water to an elevated temperature for a sufficient time to permit crystallization. The crystalline alumino-silicate zeolites are known to be useful as hydrocarbon conversion catalysts. It is also known that the crystalline zeolites may be used as selective adsorbents in separation processes, for example, to separate polar and nonpolar compounds.

Several problems have been recognized in the use of the crystalline alumino-silicate zeolites directly; i.e., without diluents, in the prior art hydrocarbon conversion and sieve separation processes. For example, the high catalytic activity of these materials has resulted in excessive coking and poor selectivity toward desired products. Moreover, the relatively low density and the poor resistance to attrition have resulted in excessive catalyst losses during operation.

In an effort to avoid some or all of the foregoing problems, several attempts have been made to use supported and/or diluted catalyst compositions. One of the more successful of these catalysts is that prepared by encapsulating the crystalline alumino-silicate zeolite in a conventional gel cracking catalyst. This type catalyst exhibits improved resistance to attrition and a reduced tendency toward erosion of the reactor equipment. There are, however, some disadvantages associated with this catalyst. For example, the high resistance to diffusion of the conventional gel type catalyst results in poor contacting between the feed and the crystalline alumino-silicate zeolite catalyst. This, in turn, reduces the overall effectiveness of the catalyst composition, leading to reduced catalyst activity and selectivity. Another problem associated with this type of catalyst is that created by the presence of two different conversion catalysts; viz the crystalline zeolite and the conventional gel cracking catalyst. These two catalysts exhibit different activities and selectivities which results in reduced control over product quality. Still another problem associated with this type catalyst is its low heat capacity which results in poor temperature control in the catalyst regenerator.

BRIEF SUMMARY

It has now been found that the foregoing and other disadvantages can be avoided by preparing a crystalline alumino-silicate zeolite directly on an inert support by the method of the present invention. Accordingly, it is an object of this invention to provide a supported crystalline alumino-silicate zeolite composition which will permit more effective contacting between the crystalline alumino-silicate zeolite and the feed. Another object of this invention is to provide a supported crystalline alumino-silicate zeolite catalyst composition having an improved activity and selectivity. Still another object of this invention is to provide a supported, crystalline alumino-silicate zeolite composition having an increased heat capacity. Yet another object is to provide an improved, economical process for preparing supported crystalline alumino-silicate zeolite compositions. Still another object of this invention is to provide a process for preparing supported crystalline alumino-silicate zeolites having improved adhesion between the zeolite and the support.

In accordance with the present invention the foregoing and other objects are accomplished by preparing crystalline alumino-silicate zeolite on the surface of an inert support material. Broadly, this is accomplished by contacting a mixture of oxides, or compounds whose chemical composition can be completely represented as a mixture of oxides, and water with the inert support material, at an elevated temperature and for a period of time sufficient to permit crystallization. The initial ratio of oxides in the mixture must be such as to yield a crystalline structure upon crystallization.

DETAILED DESCRIPTION

The supported crystalline alumino-silicate zeolites of the present invention may be prepared by the method of this invention by first dry-mixing a suitable source of $SiO_2$ with the inert support material. The dry-impregnated support is then contacted with an aqueous solution or suspension of a suitable $Al_2O_3$ source and an alkali metal oxide in water. The resulting mixture is then maintained under such conditions that crystals of the alumino-silicate zeolite deposit on the surface of the inert support material. The initial concentration and the composition of the starting materials can be varied to produce a synthetic crystalline alumino-silicate zeolite having any of the crystal structures known in the prior art. The preferred crystalline zeolite is synthetic faujasite having a Y-type crystalline structure. Synthetic faujasite is a zeolite having a pore size between 10 to 13 angstroms in the acid form and a silica to alumina ratio between about 3 and 6. Following crystallization, excess $SiO_2$ may be precipitated to improve the adhesion of the crystalline zeolite to the inert material, or the product may be washed free of unreacted materials, dried and calcined. The resulting supported, crystalline alumino-silicate zeolite may then be impregnated with various materials, or the alkali metal ion may be exchanged with any one or more of several cations, as desired for a particular end use.

Broadly, the $SiO_2/Al_2O_3$ mol ratio in the feed or initial charge; i.e. excluding the support material, will be between from about 2 to about 20, depending principally upon which particular crystalline structure is desired. In preparing the preferred, Y-type, synthetic faujasite of the present invention, it is important that the $SiO_2/Al_2O_3$ mol ratio, excluding the support material, be maintained within the range of from about 4 to about 10. When this ratio is below about 4, the Y-type faujastie will not be produced. Moreover, when the ratio is above about 10, the yield of the Y-type faujasite is reduced.

The $H_2O/Al_2O_3$ mol ratio will be between from about 30 to about 60. It has been found that dilution in excess of 60 will result in low yields of the crystalline alumino-silicate. Moreover, it has been found that when the $H_2O/Al_2O_3$ mol ratio is below about 60, the reactant mass is obtained as a dry-appearing solid, or one that is so slightly wet that it will stand in a pile without flowing, and without the oozing of any liquid from it. This material may be described as a pseudosolid. It has been found that high yields of crystalline alumino-silicate zeolite will be deposited when the reactants are in the pseudosolid form. Moreover, it has been found that the aging required for crystallization may be completed during storage of the reactants as such a pseudosolid which requires no liquid tight container.

The weight ratio of synthesized alumino-silicate to support will range between about 0.05 and 1.0. When this ratio is below about .05, the amount of crystalline zeolite deposited will not be sufficient to provide a reasonably active catalyst. When this ratio is above about 1, the characteristics of the supported product begin to approach those of the pure zeolite, and it will exhibit many of the same disadvantages.

It is within the scope of this invention to prepare a supported crystalline zeolite containing up to 50% zeolite and then dilute it down to as low as 5% by mixing with additional support or other encapsulating materials.

In preparing the catalyst of the present invention, the support material is first dry mixed with the material used as a source of $SiO_2$. The dry mixing may be accomplished in any conventional dry mixing equipment. This mixture is then mixed with a solution or suspension comprising a source of $Al_2O_3$ and an alkali metal oxide in water. This mixture is then aged, so as to form the crystalline zeolite, at a temperature between 120 and 250° F. for a period of time ranging between about 0.2 and ten days. After the crystallization is completed, the product may be washed free of unreacted materials, dried and calcined; however, it is preferred that the uncrystallized, soluble $SiO_2$ be precipitated prior to the washing step. The $SiO_2$ precipitation is accomplished by adding a dilute acid to neutralize the alkali metal which has not reacted to form zeolite. This is preferably added to a suspension of the product in 2 to 20 volumes of water per volume of total product. The product may be washed with water or other suitable material at ambient conditions. The product is dried by heating to a temperature of between 150 and 300° F. to reduce its water content to between about 1 and 10 percent. The product is activated, or calcined, by heating to a temperature between 400 and 1200° F. for a period of time between 1 and 24 hours.

Suitable supports for the present invention are inert porous materials which will not react with the alkali of the zeolite synthesis mixture. Examples of these are highly calcined aluminas, zirconias, mullite and activated charcoal. Moderate surface area, fine particle size porous aluminas are preferred to dead burned coarse corundum because of the better adhesion of these materials with the crystalline alumino-silicate zeolites, better fluidization properties, and lower cost. A preferred alumina may have the structure of kappa alumina or a diffuse (poorly developed) alpha alumina structure. It should be noted that siliceous materials containing reactive $SiO_2$ are not suitable for supports in the present invention. For the most part, when these materials have been used, no crystalline alumino-silicate zeolite was formed. In no case was it possible to produce appreciable amounts of a crystalline zeolite having a Y-type structure when the silica containing supports have been used.

Suitable sources of silica which may be used as a reactant in the present invention include precipitated silica, silica gel, silicic acid, silica sol and the alkali metal salts of silicic acid. A calcined precipitated silica is preferred. Suitable sources of alumina inlude alumina trihydrate or the alkali metal salts of aluminic acid; e.g., sodium aluminate. The alkali metal hydroxides are suitable sources of the alkali metal oxides and in addition contribute to the control of the pH at crystallization conditions.

The supported, Y-type crystalline alumino-silicate zeolite of the present invention may be used as an absorbent or as a hydrocarbon conversion catalyst. When the supported zeolite of the present invention is to be used as an absorbent, the alkali metal ion may be exchanged with other cations to yield a zeolite having a desired pore size. When the supported crystalline zeolite is to be used as a hydrocarbon conversion catalyst, the alkali metal content is usually reduced. The methods by which this is accomplished are well known in the art. The exact material or cation used to replace the alkali metal cation is generally selected on the basis of the desired end use. For example, the alkali metal ion may be base exchanged with any one or more cations of the metals of Groups I-B, II, III, IV, V, VI, VII, and VIII of the Periodic Table. When the supported crystalline zeolites of the present invention are to be used as a cracking catalyst, it is preferred that the alkali metal ion be base exchanged with a hydrogen precursor such as the ammonium ion, the magnesium ion or one or more of the rare earth metal ions. When the supported crystalline zeolite is to be used as a hydrocracking catalyst, it is preferred that hydrogenation components such as the Group VI and Group VIII metals also be incorporated into the catalyst.

PREFERRED EMBODIMENT

In a preferred embodiment of the present invention a Y-type crystalline alumino-silicate zeolite is supported on a highly calcined, moderate surface area, porous alumina. The alumina support after calcination will preferably have a kappa, theta, beta or diffuse alpha structure, and a surface area of between 1 and 80 square meters per gram. Aluminas of predominantly kappa structure and having a surface area of between about 10 and 50 are particularly preferred.

The supported catalyst is prepared by first dry-mixing the selected alumina support with a calcined, finely precipitated silica. In the preferred embodiment, the weight ratio of silica to support will be between 0.5 and 1.5 A solution of the preferred source of alumina; viz. sodium aluminate, made by dissolving alumina trihydrate in sodium hydroxide solution, is then added to the silica impregnated support. Preferably about one mol of alumina is used with 6 to 8 mols of silica and 1.7 to 2.5 mols $Na_2O$. In the preferred embodiment, the solids concentration in the resulting reaction mixture will be sufficiently high to insure that the said mixture is free of any unimbibed liquid. This will enable the mixture to be handled as a dry or slightly damp solid powder, thereby permitting it to be held in tankless storage rooms during the long aging periods required for crystallization. After the silica support mixture and the alumina-alkali solution have been mixed, the mixture is allowed to crystallize, preferably at a temperature between 90 and 100° C., for a period between one and five days. Following the crystallization step, additional hydrous silica may be added to improve the adherence of the crystalline zeolite to the support. The amount of silica added, based on the final product, may be as low as 5 percent to serve as a binder, and as high as 90 percent if large amounts of diluent are desired. The product is then preferably water washed, dried by heating to a temperature between 150 and 300° F., and calcined by heating to a temperature between 400 and 1200° F. for a period of time between one and twenty-four hours. Alternatively, one may wash the synthesis product first and then mix it with a relatively pure collodial silica such as Ludox, or with washed silica hydrogel or washed precipitated hydrous silica.

The present invention and its advantages are illustrated, but in no way limited, by the following examples.

EXAMPLES 1-4

The following examples show the effect of the support structure and particle size on the adherence of the crystalline alumino-silicate zeolite to the support. In Example 1 an alumina having a theta structure and a surface area of 65 m.²/g. was used as a support. The theta structured support was prepared by calcining a commercially available alumina, Filtrol alumina, at 1800° F. for sixteen hours. In Example 2, an alumina having a kappa structure and a surface area of 17 square meters per gram was used. This support ws prepared by calcining an Alcoa alumina, C-31, at 1800 F. for sixteen hours. In Example 3, an alumina having a diffuse alpha structure and a surface area less than 17 square meters per gram was used. This support was prepared by calcining an Alcoa C-31 alumina at 2000° F. for sixteen hours. In Example 4 an alumina having a surface area of less than 1 square meter per gram and a well crystallized alpha structure (Norton Porous Alumina) was used.

In these examples 250 grams of the support were mixed with 146.5 grams of a calcined precipitated silica (Hi-Sil). To this mixture was added a solution containing 51.7 grams of alumina trihydrate dissolved in a solution of 56 grams of sodium hydroxide in 269 cc. of water. The sodium aluminate solution was prepared by dissolving 51.7 grams of $Al_2O_3 \cdot 3H_2O$ in 112 grams of a 50% sodium hydroxide solution and then diluting with 213 grams of water. After mixing the dry support mixture and the solution for fifteen minutes, the product was stored in a closed flask for sixteen hours, at 25° C. and then for seventy-two hours at 95° C. Following the aging or crystallization step, the product was thoroughly washed, dried and then calcined at 800° F. for three hours.

The formation of a Y-type, synthetic faujasite was confirmed by X-ray diffraction. The extent to which the synthetic faujasite adhered to the support was determined by screening the product through a 325 mesh screen and determining the amount of faujasite in both the coarse and fine fraction. The results are shown in the table below.

TABLE I.—EFFECT OF SUPPORT STRUCTURE ON ADHESION OF CRYSTALLINE ZEOLITE TO THE SUPPORT

| | Support structure | Surface area, M.²/g. | Wt. percent Faujasite in coarse fraction | Wt. percent Faujasite in fines fraction | Ratios: percent in fines/ percent in coarse |
|---|---|---|---|---|---|
| Example No.: | | | | | |
| 1 | Theta | 65 | 25.6 | 33 | 1.29 |
| 2 | Kappa | (17) | 37 | 21 | 0.57 |
| 3 | Alpha (weak) | (<17) | 46 | 21 | 0.46 |
| 4 | Alpha (strong) | <1 | 13 | 48 | 3.7 |

This data clearly show that both the support structure and surface area affect the extent of adhesion between the crystalline zeolite.

EXAMPLES 5-8

These examples show the effect of the water concentration in the reaction mixture on the yield of Y-type crystalline alumino-silicate zeolite during the crystallization step. In Examples 5 and 6 an alumina having a kappa structure and prepared in the same manner as the support in Example 2 was used. In Examples 7 and 8 an alumina having a weak alpha structure and prepared in the same manner as the support in Example 3 was used.

In the examples 250 grams of the support was dry mixed with 146.5 grams of a calcined precipitated silica. The dry support-silica blend was then mixed with a solution containing 51.7 grams of $Al_2O_3 \cdot 3H_2O$ and 56 grams of sodium hydroxide. The solution was prepared in the manner set forth in Example 1, except the amount of water used in the final dilution was varied so as to vary the water concentration, in the reaction mixture. The amount of water used in each example is set forth in Table II, below, expressed as the mol ratio of total water to mols of alumina trihydrate used for the preparation. The weight percent water in the reaction mixture excluding the support is also shown. In each of the examples, the reaction mixture was held at 25° C. for sixteen hours, and then at 95° C. for seventy-two hours. The product was then thoroughly washed, dried and calcined at 800° F. for three hours.

The production of a Y-type crystalline alumino-silicate zeolite was confirmed by X-ray diffraction. The yield obtained in each example is summarized in the table below.

TABLE II.—EFFECT OF WATER CONCENTRATION ON YIELD

| Example No. | Support structure | Water content of reaction mixture, wt. percent | $H_2O/Al_2O_3$, mol ratio | Faujasite yield, wt. percent of theoretical [1] |
|---|---|---|---|---|
| 5 | Kappa | 70.7 | 50 | 79 |
| 6 | do | 72.2 | 54 | 66 |
| 7 | Alpha (diffuse) | 63.7 | 35 | 87 |
| 8 | do | 72.2 | 54 | 76 |

[1] Theoretical based on complete conversion of $Al_2O_3 \cdot 3H_2O$ to $Na_2O \cdot Al_2O_3 \cdot 5SiO_2$.

These data clearly show that an increase in water content of the reaction mass will significantly decrease the yield of faujasite produced.

EXAMPLE 9

In this example, a supported Y-type crystalline alumino-silicate zeolite was prepared by the method of Example 6, except that the amount of sodium hydroxide in the alumina solution was increased from 56 to 61.5 grams. The yield of faujasite obtained was 74% of the theoretical value.

This example, when compared with Examples 5 and 6, illustrates that the adverse effect of an increased water content can be partially offset by an increase in the sodium hydroxide concentration. In no case, however, is it possible to eliminate the adverse effect.

EXAMPLE 10

In this example a supported Y-type crystalline alumino-silicate zeolite was prepared by the method of Example 7, except that after the crystallization step, the unreacted soluble silica was precipitated in the mixture by neutralizing the excess NaOH with a solution of 52 cc. concentrated HCl in 770 cc. of water. This mixture was coagulated by heating at 90° C. for one hour, and was then filtered, washed, dried, and calcined for three hours at 800° F. The faujasite yield was 88% of theoretical as compared with 87% in Example 7. These results illustrate that the addition of the hydrous silica as a binder did not decrease the yield of the Y-type crystalline alumino-silicate zeolite. In addition, the weight percent of fines passing through a 325 mesh screen was decreased by half for the sample containing the precipitated silica binder. This clearly illustrates the effect of adding a hydrous silica in causing the adhesion of the fines to the coarser particles.

EXAMPLE 11

In this example a commercially available calcined alumina sold by the Aluminum Company of America under their Code No. A–2 was used as the support. This product is similar to the 2000° F. calcined C–31 alumina used in the above examples but it contains less fines and is more suitable for fluidization in a fluid solids process. It contains only 2–12 percent passing a 325 mesh screen, with about 46–75% being in the 100–200 mesh range. It has a moderate surface area, capable of adsorbing 0.3 to 0.5 percent water.

This support was used in a preparation similar to that of Example 10, with the unreacted soluble silica being precipitated onto the product. The yield of faujasite was 85 percent of theoretical. This product was base exchanged twice using 1.6 grams $NH_4Cl$ per gram of faujasite, and twice with the same amount of rare earth chlorides (didymium chloride hexahydrate). It was then washed, dried, formed as ¼-inch pills and calcined three hours at 1000° F.

This product was used as a cracking catalyst, passing 1.2 volumes of a 0.89 specific gravity oil with a boiling point above 500° F. over one volume of catalyst per hour, for two hours, at 975° F. The condensed liquid product was distilled and gave 47 volume percent of a 430° F. end point gasoline. The clear research octane number of this gasoline was 94.

The above example clearly demonstrates the utility of these products as acid type catalysts. Although tested in a fixed bed, the supported zeolite has the right particle size range to make an excellent fluidized cracking catalyst.

Having thus described and illustrated the present invention, what is claimed and sought to be protected by Letters Patent is:

1. A process for preparing a catalyst composition compising a supported crystalline alumino-silicate zeolite having a Y-type faujasite crystalline structure comprising the steps of (1) dry mixing an inert support with a compound comprising essentially $SiO_2$, (2) admixing the support-$SiO_2$ mixture with a solution comprising a source of reactive $Al_2O_3$ and a source of an alkali metal hydroxide in water, wherein the $SiO_2$ to $Al_2O_3$ ratio, excluding the support, is between 4 and 10; the alkali metal oxide to $Al_2O_3$ mol ratio is between 1.7 and 2.5; and the $H_2O$ to $Al_2O_3$ mol ratio is between 30 and 60, (3) crystallizing the resulting admixture at a temperature between 120 and 250° F., (4) recovering a supported Y-type crystalline alumino-silicate in the alkali metal form.

2. A process for preparing a supported Y-type crystalline alumino-silicate zeolite catalyst composition comprising the steps of (1) dry mixing an inert alumina support with a compound comprising $SiO_2$, (2) admixing the dry support-$SiO_2$ mixture with a solution comprising a source of reactive $Al_2O_3$ and a source of an alkali metal hydroxide in water, wherein the $SiO_2$ to $Al_2O_3$ ratio, excluding the support, is between 4 and 10; the alkali metal oxide to $Al_2O_3$ mol ratio is between 1.7 and 2.5; and the $H_2O$ to $Al_2O_3$ mol ratio is between 30 and 60, (3) crystallizing the resulting admixture at a temperature between 120 and 250° F., (4) adding or precipitating a hydrous form of silica onto the crystallized admixture in small amounts, so as to improve the adhesion of the crystalline zeolite to the support material, (5) recovering a supported Y-type crystalline alumino-silicate in an alkali metal form, and (6) replacing at least a portion of the alkali metal content of said zeolite with another cation.

3. A process for preparing a supported crystalline alumino-silicate having a Y-type, faujasite, crystalline structure comprising the steps of (1) dry mixing an inert support with a compound comprising essentially $SiO_2$, (2) admixing the support-$SiO_2$ mixture with a solution comprising a source of reactive $Al_2O_3$ and a source of alkali metal hydroxide in water, wherein the mol ratio of $SiO_2$ to $Al_2O_3$, excluding the support, is between the range of 4 and 10; the mol ratio of alkali metal oxide to $Al_2O_3$ is between 1.7 and 2.5; and the mol ratio of $H_2O$ to $Al_2O_3$ is between 30 and 60, (3) crystallizing the resulting admixture at a temperature between 120 and 250° F., and (4) recovering a supported Y-type crystalline alumino-silicate.

4. A process for preparing a supported Y-type crystalline alumino-silicate zeolite comprising the steps of (1) dry mixing an inert alumina support with a compound comprising $SiO_2$, (2) admixing the dry support-$SiO_2$ mixture with a solution comprising a source of reactive $Al_2O_3$ and a source of alkali metal hydroxide in water, wherein the $SiO_2$ to $Al_2O_3$ mol ratio, excluding the support, is between 4 and 10, the alkali metal oxide to $Al_2O_3$ mol ratio is between 1.7 and 2.5, the $H_2O$ to $Al_2O_3$ mol ratio is between 30 and 60; and the weight ratio of Y-type crystalline zeolite to the support is between 0.5 and 1, (3) crystallizing the resulting admixture at a temperature between 120 and 250° F., (4) adding or precipitating a hydrous form of silica onto the crystallized admixture in small amounts, so as to improve the adhesion of the crystalline zeolite to the support material, and (5) recovering a supported Y-type crystalline alumino-silicate.

5. A method for preparing a supported, Y-type crystalline alumino-silicate zeolite catalyst composition comprising the steps of (1) dry mixing an inert support material with a source of $SiO_2$, (2) admixing the said support-$SiO_2$ mixture with a solution comprising a source of reactive $Al_2O_3$ and a source of alkali metal hydroxide in water, wherein the $SiO_2$ to $Al_2O_3$ mol ratio, excluding the support, is between 4 and 10, the alkali metal oxide to $Al_2O_3$ mol ratio is between 1.7 and 2.5; and the $H_2O$ to $Al_2O_3$ mol ratio is between 30 and 60, (3) crystallizing the said admixture at a temperature between 120 and 250° F., (4) recovering a supported Y-type crystalline alumino-silicate zeolite, said zeolite being in an alkali metal form, and (5) replacing at least a portion of the alkali metal content of said zeolite with another cation.

6. The process of claim 3 wherein said inert support material is a moderate surface area, fine particle size porous alumina.

7. The process of claim 3 wherein said inert support material has a structure selected from the group consisting of kappa alumina, diffuse alpha alumina and mixtures thereof.

8. The process of claim 3 wherein said source of reactive $Al_2O_3$ is selected from the group consisting essentially of sodium aluminate and alumina trihydrate.

9. The process of claim 3 wherein the weight ratio of synthesized zeolite to the support is within the range of .05 and 1.0.

10. The process of claim 9 wherein the $SiO_2$ wherein the $SiO_2$ is in the form of a calcined precipitated silica.

11. The process of claim 3 wheein the said inert support is an alumina.

12. The process of claim 4 wherein the $SiO_2$ is present as a calcined, finely precipitated silica.

13. The process of claim 12 wherein the said source of alkali metal hydroxide is sodium hydroxide.

14. A process for preparing a supported, Y-type crystalline alumino-silicate zeolite catalyst composition comprising the steps of (1) dry mixing an inert alumina support with a compound comprising $SiO_2$, (2) admixing the dry support-$SiO_2$ mixture with a solution comprising a source of reactive $Al_2O_3$ and a source of an alkali metal hydroxide in water, wherein the $SiO_2$ to $Al_2O_3$ mol ratio, excluding the support, is between 4 and 10; the alkali metal oxide to $Al_2O_3$ mol ratio is between 1.7 and 3.5; and the $H_2O$ to $Al_2O_3$ mol ratio is between 30 and 60, (3) crystallizing the resulting admixture at a temperature between 120° and 250° F., (4) precipitating a hydrous form of silica from the crystallized admixture so as to improve the adhesion of the crystalline zeolite to the support material, (5) recovering a supported Y-type crystalline aluminosilicate in alkali metal form, and (6) replacing at least a portion of the alkali metal content of said zeolite with another cation.

15. A process for preparing a catalyst composition comprising a supported crystalline alumino-silicate zeolite having a Y-type faujasite crystalline structure comprising the steps of (1) dry mixing an inert support with a compound comprising essentially $SiO_2$, (2) admixing the support-$SiO_2$ mixture with a solution comprising a source of reactive $Al_2O_3$ and a source of an alkali metal hydroxide in water, wherein the $SiO_2$ to $Al_2O_3$ mol ratio, excluding the support, is between 4 and 10; the alkali metal oxide to $Al_2O_3$ mol ratio is between 1.7 and 2.5; and the $H_2O$ to $Al_2O_3$ mol ratio is between 30 and 60, (3) crystallizing the resulting admixture at a temperature between 120° and 250° F., (4) precipitating a hydrous form of silica from the reaction mixture so as to improve the adhesion of the crystalline zeolite to the inert support material, (5) recovering a supported Y-type crystalline alumino-silicate in the alkali metal form, and (6) recovering a supported Y-type crystalline alumino-silicate.

References Cited

UNITED STATES PATENTS

| | | | |
|---|---|---|---|
| 3,275,571 | 9/1966 | Mattox | 252—455 X |
| 3,244,643 | 4/1966 | Schwartz | 252—455 |
| 3,367,886 | 2/1968 | Haden et al. | 252—455 |
| 3,386,802 | 6/1968 | Michalko | 23—112 |
| 3,410,808 | 11/1968 | Smith et al. | 252—455 X |

DANIEL E. WYMAN, Primary Examiner

C. F. DEES, Assistant Examiner